(12) United States Patent
Lord et al.

(10) Patent No.: US 9,057,013 B2
(45) Date of Patent: Jun. 16, 2015

(54) METHODS AND COMPOSITIONS OF TREATING A SUBTERRANEAN FORMATION WITH AN OPTIMIZED TREATMENT FLUID

(71) Applicant: Halliburton Energy Services, Inc., Houston, TX (US)

(72) Inventors: Paul D. Lord, Houston, TX (US); Renee A. LeBas, Houston, TX (US); Jim D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/867,389

(22) Filed: Apr. 22, 2013

(65) Prior Publication Data

US 2014/0315766 A1    Oct. 23, 2014

(51) Int. Cl.
| | |
|---|---|
| C09K 8/72 | (2006.01) |
| C09K 8/68 | (2006.01) |
| C09K 8/10 | (2006.01) |
| C09K 8/08 | (2006.01) |
| C09K 8/20 | (2006.01) |
| C09K 8/512 | (2006.01) |
| C09K 8/575 | (2006.01) |

(52) U.S. Cl.
CPC . *C09K 8/685* (2013.01); *C09K 8/08* (2013.01); *C09K 8/20* (2013.01); *C09K 8/512* (2013.01); *C09K 8/5756* (2013.01)

(58) Field of Classification Search
CPC .......... C09K 8/887; C09K 8/512; C09K 8/74; C09K 8/72; C09K 8/58
USPC .................................................. 507/215, 277
See application file for complete search history.

(56) References Cited

U.S. PATENT DOCUMENTS

| | | | |
|---|---|---|---|
| 5,024,276 A | 6/1991 | Borchardt | |
| 6,100,222 A | 8/2000 | Vollmer et al. | |
| 6,599,863 B1 | 7/2003 | Palmer et al. | |
| 6,640,898 B2 * | 11/2003 | Lord et al. | ..................... 166/300 |
| 6,810,959 B1 | 11/2004 | Qu et al. | |
| 2005/0211435 A1 * | 9/2005 | Monroe et al. | ................ 166/292 |
| 2009/0145607 A1 | 6/2009 | Li | |

FOREIGN PATENT DOCUMENTS

WO    2014176090 A1    10/2014

OTHER PUBLICATIONS

International Search Report and Written Opinion for PCT/US2014/034338 dated Aug. 22, 2014.

* cited by examiner

*Primary Examiner* — Susannah Chung
*Assistant Examiner* — Atnaf Admasu
(74) *Attorney, Agent, or Firm* — McDermott Will & Emery LLP; Craig W. Roddy

(57) ABSTRACT

Methods of treating a subterranean formation including providing a treatment fluid comprising a brine base fluid and an anionic carboxylated polysaccharide, wherein the brine base fluid comprises a concentration of salt in the range of from about 30,000 ppm to saturation and a pH in the range of from about 4 to about 8, and wherein the anionic carboxylated polysaccharide is present in the range of from about 0.05% to about 2% by weight of the treatment fluid; and introducing the treatment fluid into the subterranean formation.

15 Claims, 2 Drawing Sheets

METHODS AND COMPOSITIONS OF TREATING A SUBTERRANEAN FORMATION WITH AN OPTIMIZED TREATMENT FLUID

BACKGROUND

The present invention relates to methods and compositions of treating a subterranean formation with an optimized treatment fluid comprising a brine base fluid and an anionic carboxylated polysaccharide.

Subterranean wells (such as hydrocarbon producing wells and water wells) are often stimulated by hydraulic fracturing treatments. In hydraulic fracturing treatments, a viscous fracturing fluid, which may also function as a carrier fluid to carry particulates, is pumped into a portion of a subterranean formation at a rate and pressure such that the subterranean formation breaks down and one or more fractures are formed. Typically, particulate solids, such as graded sand, are suspended in a portion of the fracturing fluid or another fluid and then deposited into the fractures. These particulate solids, known as "proppant particulates" or simply "proppant," serve to prevent the fractures from fully closing once the hydraulic pressure is removed. By keeping the fracture from fully closing, the proppant aids in forming conductive paths through which fluids may flow.

Fracturing fluids are often aqueous based fluids, which are viscosified using gelling agents (e.g., polymers) or gelling agents in combination with crosslinking agents. Often, crosslinking agents are very sensitive to the pH of the fluid and the viscosity may rise or fall dependent on the pH. While care is taken to control the fluid pH, it may be affected by the conditions of the subterranean formation. For example, the presence of soluble or partially soluble metal ions in the formation may result in considerable pH changes in the fracturing fluid. As such, the performance of the fracturing fluid may be significantly affected, resulting in, for example, the premature settling of the proppant particulates out of the fracturing fluid. Premature settling of the proppant particulates may result in fracture closure or partial closure after hydraulic pressure is removed, thereby reducing the production potential of the formation. Additionally, the fracturing fluid may be impacted fluid loss from the fracturing fluid into undesirable locations within the subterranean formation. Such fluid loss may be controlled in order to produce an effective fracturing fluid. Fluid loss control is often controlled by the gelling agents and/or crosslinking agents used to viscosify the fluid or by adding particulate solids to the fluid for the purpose of closing pore throats or other avenues for fluid loss.

Thus, fracturing fluid design can be very complex, and fracturing fluids are often designed for narrow sets of reservoir and/or pumping constraints. The complexity is further exacerbated because the availability of vast quantities of fresh water for subterranean formation operations has recently become substantially reduced both for environmental and political reasons. As a result, fracturing operations are preferably performed with sources of water such as seawater, produced water from a formation, or reclaimed water. These water sources, however, do not possess the predictable chemistry that fresh water possesses and typically contains high salt concentrations of diverse ions, often in a concentration of greater than 30,000 parts per million ("ppm") or even greater than 200,000 ppm. This "high salt concentration water" or "high salt concentration fluid" has historically been less effective as a stable fracturing fluid capable of relatively uniformly suspending proppant particulates for delivery into a fracture, largely because gelling agents and/or crosslinking agents may be salted out of the high salt concentration fluid. Therefore, an effective fracturing fluid having a high salt concentration base fluid that may be used in subterranean formation operations may be of benefit to one of ordinary skill in the art.

SUMMARY OF THE INVENTION

The present invention relates to methods and compositions of treating a subterranean formation with an optimized treatment fluid comprising a brine base fluid and an anionic carboxylated polysaccharide.

In some embodiments, the present invention provides a method of treating a subterranean formation comprising: providing a treatment fluid comprising a brine base fluid and an anionic carboxylated polysaccharide, wherein the brine base fluid comprises a concentration of salt in the range of from about 30,000 ppm to saturation and a pH in the range of from about 4 to about 8, and wherein the anionic carboxylated polysaccharide is present in the range of from about 0.05% to about 2% by weight of the treatment fluid; and introducing the treatment fluid into the subterranean formation.

In other embodiments, the present invention provides a method of treating a subterranean formation comprising: providing a treatment fluid comprising a brine base fluid and an anionic carboxylated polysaccharide, wherein the brine base fluid comprises a salt concentration in the range of from about 30,000 ppm to saturation and a pH in the range of from about 4 to about 8, wherein the anionic carboxylated polysaccharide is selected from the group consisting of carboxymethyl guar; carboxymethyl cellulose; carboxymethyl hydroxypropyl guar; carboxymethyl hydroxyethyl cellulose; carboxymethyl hydroxypropyl cellulose; and any combination thereof, and wherein the anionic carboxylated polysaccharide is present in the range of from about 0.05% to about 2% by weight of the treatment fluid; and introducing the treatment fluid into the subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
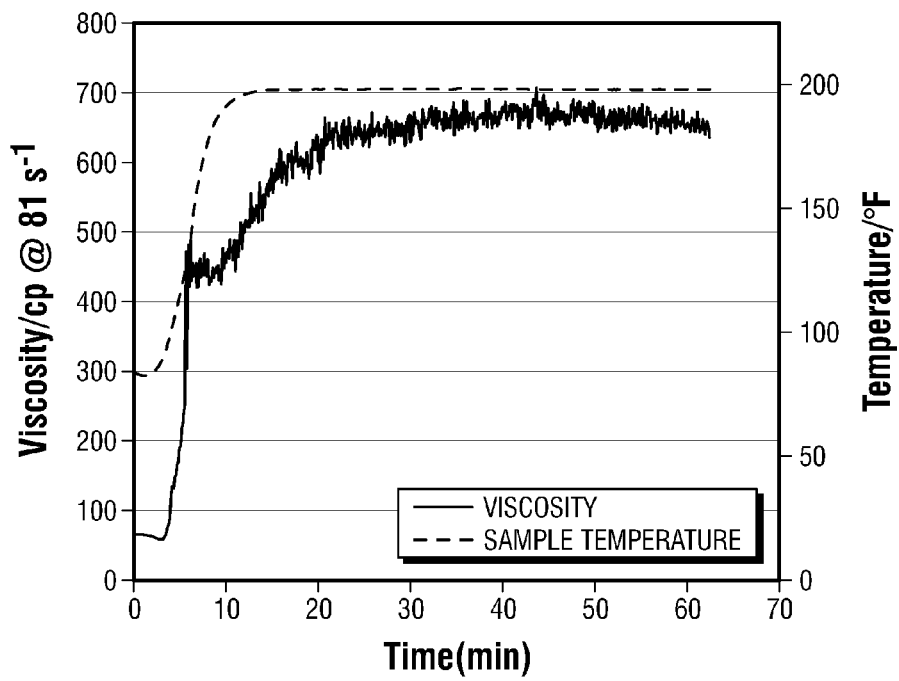
FIG. 1 represents the viscosity readings of treatment fluid 1 prepared according to Example 1 and tested for 60 minutes at a target temperature of 200° F.

The present invention relates to methods and compositions of treating a subterranean formation with an optimized treatment fluid comprising a brine base fluid and an anionic carboxylated polysaccharide. Specifically, the present invention relates to high salt concentration treatment fluids that may be used in any subterranean formation, with consideration given to the particular conditions (e.g., pH, temperature, salinity, and the like) of the formation, and that is effective at, among other things, suspending proppant particulates. The treatment fluids may further contribute to controlling fluid loss. Although the methods of the present invention are often described herein as applying the fracturing operations, they may also be of use in any subterranean formation operation, such as lost circulation operations, sand control operations, completion operations, acidizing operations, scale inhibiting operations, water-blocking operations, clay stabilizer operations, frac-packing operations, gravel packing operations, wellbore strengthening operations, sag control operations, and the like. One of ordinary skill in the art, with the benefit of this disclosure, will recognize whether the treatment fluids of the present invention will benefit a particular subterranean operation.

In some embodiments, the present invention provides for a method of treating a subterranean formation with a treatment fluid using a brine base fluid and an anionic carboxylated polysaccharide. The brine base fluid may have a salt concentration in the range of from about 30,000 ppm to saturation.

The brine base fluids of the present invention may be any aqueous-based brine fluid. In some embodiments, the brine base fluid may be seawater, produced water from a formation (e.g., water that is recovered along with oil or gas), or reclaimed water (e.g., treated or untreated wastewater). In some embodiments, the dissolved solids in the brine base fluid may include, for example, salts comprising ions of aluminum; boron; barium; calcium; chloride; iron; potassium; magnesium; sodium; strontium; sulfate; carbonate; bicarbonate; and any combination thereof. Typically, the brine base fluids of the present invention will have a salt concentration of about 30,000 ppm to saturation of the fluid and a pH of from about 4 to about 8. In some preferred embodiments, the pH of the brine fluid is from about 5 to about 7.

In some embodiments, the anionic carboxylated polysaccharide comprises a linear or branched alkyl group and/or hydroxyalkyl group. Suitable alkyl groups include, but are not limited to, an ethyl group; a methyl group; a propyl group; an isopropyl group; a butyl group; an isobutyl group; a tertiary butyl group; derivatives thereof; and any combination thereof. Suitable hydroxyalkyl groups for use in the present invention include, but are not limited to, a hydroxyethyl group; a hydroxypropyl group; a hydroxyisopropyl group; a hydroxybutyl group; a hydroxisobutyl group; a hydroxy-tert-butyl group; derivatives thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. The alkyl or hydroxyalkyl groups of the present invention may, in some embodiments, react with an anionic carboxylated groups to form the anionic carboxylated polysaccharides of the present invention. Suitable anionic carboxylated groups may include, but are not limited to, a carboxymethyl group; a carboxyethyl group; a carboethoxy group; a carbopropoxy group; and any combination thereof. The anionic carboxylated polysaccharides of the present invention may additionally include a sulfonate or sulfonate derivative. Specific examples of suitable anionic carboxylated polysaccharides for use in the methods of the present invention include, but are not limited to, carboxymethyl guar ("CMG"); carboxymethyl cellulose ("CMC"); carboxymethyl hydroxypropyl guar ("CMHPG"); carboxymethyl hydroxyethyl cellulose ("CMHEC"); carboxymethyl hydroxypropyl cellulose ("CMHPC"); and any combination thereof. In some embodiments, the anionic carboxylated polysaccharide is present in the treatment fluid of the present invention the range of from about 0.05% to about 2% by weight of the treatment fluid. In preferred embodiments, the anionic carboxylated polysaccharide is present the treatment fluid of the present invention in the range of from about 0.1% to about 1.5% by weight of the treatment fluid.

The anionic carboxylated polysaccharides (also referred to herein as "anionic polymers") of the present invention are unexpectedly effective in high salt concentration brine fluids at achieving viscosities necessary for subterranean operations. Typically, anionic polymers are easily salted out of high salt concentration solutions. Moreover, fluids having high salt concentrations interact with electrolytes on the anionic polymers, thereby reducing the mutual repulsive interactions of the individual polymers. Indeed, it is known in the art that even monovalent ions affect the viscosity development of anionic polymers. For example, prior comparisons by industry professionals has revealed that the viscosity of CMHPG in only a 2% brine solution is significantly lower than the same concentration of CMHPG in deionized water, even after a short period of time.

In some embodiments, the anionic carboxylated polysaccharides of the present invention may be additionally crosslinked. Suitable crosslinking agents include, but are not limited to, a salt of zirconium; a salt of aluminum; a salt of titanium; and any combination thereof. These metals may be delivered as chelates for use as crosslinking agents of the present invention including, but not limited to, a zirconium chelate; an aluminum chelate; a titanium chelate; and any combination thereof. In preferred embodiments, the crosslinking agent is a zirconium chelate. Suitable zirconium chelates include, but are not limited to, a zirconium lactate chelate; a zirconium acetate chelate; a zirconium acetylacetonate chelate; and any combination thereof. Suitable aluminum chelates include, but are not limited to, an aluminum lactate chelate; an aluminum acetate chelate; an aluminum acetylacetonate chelate; and any combination thereof. Suitable titanium chelates include, but are not limited to, a titanium lactate chelate; a titanium acetate chelate; a titanium acetylacetonate chelate; and any combination thereof. The crosslinking agent may be present in the treatment fluids of the present invention in an amount in the range of from about 0.005% to about 1% by weight of the treatment fluid. In certain embodiments, the crosslinking agent may be present in the treatment fluids of the present invention in an amount in the range of from about 0.05% to about 1% by weight of the treatment fluid.

In some embodiments, the treatment fluids of the present invention may further comprise any additive necessary to perform the desired subterranean formation operation. Suitable additives for use in the treatment fluids of the present invention may include, but are not limited to, an inert solid; a fluid loss control agent; an emulsifier; a dispersion aid; a corrosion inhibitor; an emulsion thinner; an emulsion thickener; a viscosifying agent; a surfactant; a particulate; a proppant; a gravel particulate; a lost circulation material; a foaming agent; a gas; a pH control additive; a biocide; a scale inhibitor; a friction reducer; a clay stabilizing agent; and any combination thereof Typically, treatment fluids are capable of adequately suspending particulates (e.g., proppant particulates) at viscosities greater than about 100 cP at the estimated shear environment. Because the viscosity of treatment fluids may vary under differing shear rates, it is necessary that under the various shear rates encountered in a subterranean formation operation, the viscosity of the treatment fluid remains at least greater than about 100 cP at the estimated shear environment. The treatment fluids of the present invention are capable of achieving desirable viscosities that remain relatively stable under varying shear rates. In some embodiments, the viscosity of the treatment fluids of the present invention may be in the range of from about 100 to about 2000 cP at the estimated shear environment. Additionally, the treatment fluids of the present invention are capable of achieving desirable viscosities that remain relatively stable under varying pH values and temperatures. Operational viscosities will depend on certain conditions including, but not limited to, the properties of the formation, the temperature of the formation, and/or the fracture design.

To facilitate a better understanding of the present invention, the following examples of preferred or representative embodiments are given. In no way should the following examples be read to limit, or to define, the scope of the invention.

EXAMPLE 1

The viscosity of "treatment fluid 1" comprising a high salt concentration base fluid with 25 pounds per 1000 gallons ("ppg") of the anionic carboxylated polysaccharide CMHPG was evaluated, corresponding to about 0.31% by weight of treatment fluid 1. The brine base fluid had a total salt concentration of 293,150 ppm, a pH of 7.29, and a specific gravity of 1.223. Using a Chandler 5550 HPHT viscometer, the viscosity of the treatment fluid 1 was measured over 60 minutes at target temperature 200° F. The target temperature was reached after 10 minutes. At a shear rate of 40 $sec^{-1}$ and a rotational speed of 160 rpm using an B2 bob, treatment fluid 1 reached approximately 450 cP after 10 minutes and then leveled off after 20 minutes at approximately 650 cP for the remaining testing time, demonstrating that the viscosity of treatment fluid 1 is capable of particulate suspension even after the elapse of 60 minutes, as shown in FIG. 1.

EXAMPLE 2

Figure 2:
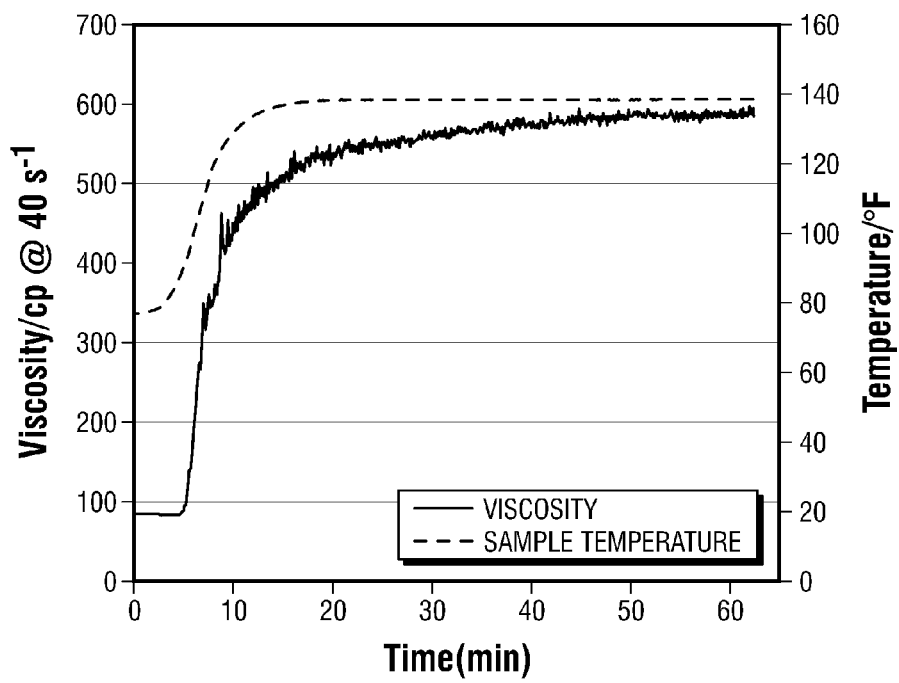
FIG. 2 shows the viscosity readings of treatment fluid 2 prepared according to Example 2 and tested for 60 minutes at a target temperature of 140° F.

The viscosity of "treatment fluid 2" comprising a high salt concentration base fluid with 25 pounds per 1000 gallons ("ppg") of the anionic carboxylated polysaccharide CMHPG was tested, corresponding to about 0.31% by weight of treatment fluid 2. The brine base fluid had a total salt concentration of 280,398 ppm, a pH of 6.87, and a specific gravity of 1.207. Using the viscometer in Example 1, the viscosity of the treatment fluid 2 was measured over 60 minutes at target temperature 140° F. The target temperature was reached after 10 minutes. At a shear rate of 40 $sec^{-1}$ and a rotational speed of 160 rpm using an B2 bob, treatment fluid 2 reached approximately 450 cP after 10 minutes. Thereafter, the viscosity of treatment fluid 2 continued to rise and reached approximately 680 cP at 60 minutes, demonstrating that the viscosity of treatment fluid 2 is capable of particulate suspension over 60 minutes, as shown in FIG. 2.

EXAMPLE 3

Figure 3:
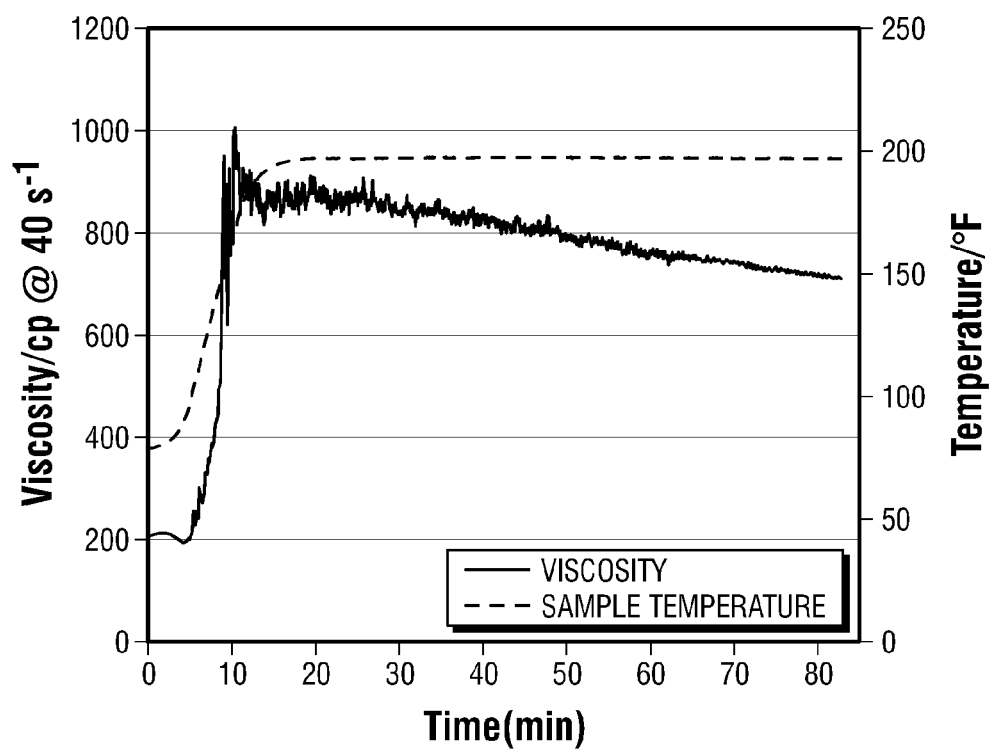
FIG. 3 depicts the viscosity readings of treatment fluid 3 prepared according to Example 3 and tested for 80 minutes at a target temperature of 140° F.

The viscosity of "treatment fluid 3" comprising a high salt concentration base fluid with 25 pounds per 1000 gallons ("ppg") of the anionic carboxylated polysaccharide CMHPG was measured, corresponding to about 0.31% by weight of treatment fluid 3. The brine base fluid had a total salt concentration of 270,432 ppm, a pH of 7.20, and a specific gravity of 1.186. Using the viscometer in Example 1, the viscosity of the treatment fluid 3 was measured over 80 minutes at target temperature 200° F. The target temperature was reached after 10 minutes. At a shear rate of 40 $sec^{-1}$ and a rotational speed of 160 rpm using an B2 bob, treatment fluid 3 reached approximately 1000 cP after 10 minutes. Thereafter, the viscosity of treatment fluid 3 declined and reached approximately 700 cP at 80 minutes, demonstrating that the viscosity of treatment fluid 3 is capable of particulate suspension over 80 minutes, as shown in FIG. 3.

Embodiments disclosed herein include:

A. A method of treating a subterranean formation comprising providing a treatment fluid comprising a brine base fluid and an anionic carboxylated polysaccharide, wherein the brine base fluid comprises a concentration of salt in the range of from about 30,000 ppm to saturation and a pH in the range of from about 4 to about 8, and wherein the anionic carboxylated polysaccharide is present in the range of from about 0.05% to about 2% by weight of the treatment fluid, and introducing the treatment fluid into the subterranean formation.

B. A method of treating a subterranean formation comprising providing a treatment fluid comprising a brine base fluid and an anionic carboxylated polysaccharide, wherein the brine base fluid comprises a salt concentration in the range of from about 30,000 ppm to saturation and a pH in the range of from about 4 to about 8, wherein the anionic carboxylated polysaccharide is selected from the group consisting of carboxymethyl guar; carboxymethyl cellulose; carboxymethyl hydroxypropyl guar; carboxymethyl hydroxyethyl cellulose; carboxymethyl hydroxypropyl cellulose; and any combination thereof, and wherein the anionic carboxylated polysaccharide is present in the range of from about 0.05% to about 2% by weight of the treatment fluid, and introducing the treatment fluid into the subterranean formation.

Each of embodiments A and B may have one or more of the following additional elements in any combination:

Element 1: Salts in the brine base fluid comprising ions selected from the group consisting of aluminum; boron; barium; calcium; chloride; iron; potassium; magnesium; sodium; strontium; sulfate; carbonate; bicarbonate; and any combination thereof.

Element 2: An anionic carboxylated polysaccharides that comprises at least one selected from the group consisting of an alkyl group; a hydroxylalkyl group; and any combination thereof.

Element 3: An anionic carboxylated polysaccharide that comprises an alkyl group selected from the group consisting of to an ethyl group; a methyl group; a propyl group; an isopropyl group; derivatives thereof; and any combination thereof.

Element 4: An anionic carboxylated polysaccharide that comprises a hydroxyalkyl group selected from the group consisting of a hydroxyethyl group; a hydroxypropyl group; a hydroxyisopropyl group; a hydroxybutyl group; a hydroxyisobutyl group; a hydroxyl-tert-butyl group; derivatives thereof; and any combination thereof.

Element 5: Wherein the anionic carboxylated polysaccharide is present in the range of from about 0.1% to about 1.5% by weight of the treatment fluid.

Element 6: Wherein the treatment fluid has a pH in the range of from about 5 to about 7.

Element 7: Wherein the viscosity of the treatment fluid is in the range of from about 100 cP to about 2000 cP.

Element 8: The treatment fluid further comprising a crosslinking agent selected from the group consisting of a salt of zirconium; a salt of aluminum; a salt of titanium; and any combination thereof.

Element 9: The treatment fluid further comprising a crosslinking agent that is a zirconium chelate selected from the group consisting of a zirconium lactate chelate; a zirconium acetate chelate; a zirconium acetylacetonate chelate; and any combination thereof.

Element 10: The treatment fluid further comprising a crosslinking agent that is an aluminum chelate selected from the group consisting of an aluminum lactate chelate; an aluminum acetate chelate; an aluminum acetylacetonate chelate; and any combination thereof.

Element 11: The treatment fluid further comprising a crosslinking agent that is a The method of claim 1, wherein the crosslinking agent is a titanium chelate selected from the group consisting of a titanium lactate chelate; a titanium acetate chelate; a titanium acetylacetonate chelate; and any combination thereof.

By way of non-limiting example, exemplary combinations applicable to A and B include: A in combination with 1, 3, and 5; A in combination with 7 and 8; B in combination with 5, 7, and 6; or B in combination with 6 and 9.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
   providing a treatment fluid comprising a brine base fluid and an anionic carboxylated polysaccharide,
      wherein the brine base fluid is produced water and comprises a concentration of salt in the range of from about 30,000 ppm to saturation and a pH in the range of from about 4 to about 8,
      wherein the brine base fluid comprises salt including ions selected from the group consisting of boron; iron; strontium; sulfate; and any combination thereof, and
      wherein the anionic carboxylated polysaccharide is selected from the group consisting of carboxymethyl guar; carboxymethyl cellulose; carboxymethyl hydroxypropyl guar; carboxymethyl hydroxyethyl cellulose; carboxymethyl hydroxypropyl cellulose; and any combination thereof, and is present in the range of from about 0.05% to 0.28% by weight of the treatment fluid; and
   introducing the treatment fluid into the subterranean formation.

2. The method of claim 1, wherein the treatment fluid further comprises an additional anionic carboxylated polysaccharide comprising at least one of an alkyl group and a hydroxyalkyl group.

3. The method of claim 2, wherein the alkyl group is selected from the group consisting of an ethyl group; a methyl group; a propyl group; an isopropyl group; a butyl group; an isobutyl group; a tertiary butyl group; derivatives thereof; and any combination thereof.

4. The method of claim 2, wherein the hydoxyalkyl group is selected from the group consisting of a hydroxyethyl group; a hydroxypropyl group; a hydroxyisopropyl group; a hydroxybutyl group; a hydroxyisobutyl group; a hydroxy-tert-butyl group; derivatives thereof; and any combination thereof.

5. The method of claim 1, wherein the treatment fluid further comprises a crosslinking agent selected from the group consisting of a salt of zirconium; a salt of aluminum; a salt of titanium; and any combination thereof.

6. The method of claim 1, wherein the treatment fluid further comprises a crosslinking agent that is a zirconium chelate selected from the group consisting of a zirconium lactate chelate; a zirconium acetate chelate; a zirconium acetylacetonate chelate; and any combination thereof.

7. The method of claim 1, wherein the treatment fluid further comprises a crosslinking agent that is an aluminum chelate selected from the group consisting of an aluminum lactate chelate; an aluminum acetate chelate; an aluminum acetylacetonate chelate; and any combination thereof.

8. The method of claim 1, wherein the treatment fluid further comprises a crosslinking agent that is a titanium chelate selected from the group consisting of a titanium lactate chelate; a titanium acetate chelate; a titanium acetylacetonate chelate; and any combination thereof.

9. A method of treating a subterranean formation comprising:
   providing a treatment fluid comprising a brine base fluid and an anionic carboxylated polysaccharide,
      wherein the viscosity of the treatment fluid is in the range of from about 100 cP to about 2000 cP,
      wherein the brine base fluid comprises a salt concentration in the range of from about 30,000 ppm to saturation and a pH in the range of from about 4 to about 8,
      wherein the brine base fluid is produced water and comprises salt including ions selected from the group consisting of boron; iron; strontium; sulfate; and any combination thereof,
      wherein the anionic carboxylated polysaccharide is selected from the group consisting of carboxymethyl guar; carboxymethyl cellulose; carboxymethyl hydroxypropyl guar; carboxymethyl hydroxyethyl cellulose; carboxymethyl hydroxypropyl cellulose; and any combination thereof, and wherein the anionic carboxylated polysaccharide is present in the range of from about 0.05% to about 0.28% by weight of the treatment fluid; and introducing the treatment fluid into the subterranean formation.

10. The method of claim 9, wherein the pH of the brine base fluid is in the range of from about 5 to about 7.

11. The method of claim 9, wherein the treatment fluid further comprises a crosslinking agent selected from the group consisting of a salt of zirconium; a salt of aluminum; a salt of titanium; and any combination thereof.

12. The method of claim 9, wherein the treatment fluid further comprises a crosslinking agent that is a zirconium chelate selected from the group consisting of a zirconium lactate chelate; a zirconium acetate chelate; a zirconium acetylacetonate chelate; and any combination thereof.

13. The method of claim 9, wherein the treatment fluid further comprises a crosslinking agent that is an aluminum chelate selected from the group consisting of an aluminum lactate chelate; an aluminum acetate chelate; an aluminum acetylacetonate chelate; and any combination thereof.

14. The method of claim 9, wherein the treatment fluid further comprises a crosslinking agent that is a titanium chelate selected from the group consisting of a titanium lactate chelate; a titanium acetate chelate; a titanium acetylacetonate chelate; and any combination thereof.

15. The method of claim 1, wherein the viscosity of the treatment fluid is in the range of from about 100 cP to about 2000 cP.

* * * * *